US012763043B2

(12) United States Patent
Velath

(10) Patent No.: US 12,763,043 B2
(45) Date of Patent: Oct. 13, 2026

(54) COLLAPSIBLE THIGH SUPPORT APPARATUS FOR STRINGED INSTRUMENTS

(71) Applicant: Praveen Velath, Dubai (AE)

(72) Inventor: Praveen Velath, Dubai (AE)

( * ) Notice: Subject to any disclaimer, the term of this patent is extended or adjusted under 35 U.S.C. 154(b) by 0 days.

(21) Appl. No.: 19/534,088

(22) Filed: Feb. 9, 2026

(65) Prior Publication Data

US 2026/0260634 A1 Sep. 3, 2026

Related U.S. Application Data

(60) Provisional application No. 63/766,153, filed on Mar. 3, 2025.

(51) Int. Cl.
*G10D 3/18* (2020.01)

(52) U.S. Cl.
CPC .................................... *G10D 3/18* (2013.01)

(58) Field of Classification Search
CPC ........................................................ G10D 3/18
USPC ............................................................ 84/327
See application file for complete search history.

(56) References Cited

U.S. PATENT DOCUMENTS 6,459,025 B1 * 10/2002 D'Addario ............. G10D 3/053
84/318
2023/0038187 A1 * 2/2023 Lucksom ................ G10G 5/00

* cited by examiner

*Primary Examiner* — Jianchun Qin
(74) *Attorney, Agent, or Firm* — INNOVATION CAPITAL LAW GROUP, LLP; Vic Lin

(57) ABSTRACT

A thigh support apparatus includes a first section of brackets comprising a first upper bracket and a second upper bracket arranged parallel to each other. A second section of brackets comprises a first lower bracket and a second lower bracket arranged parallel to each other. The first and second sections are connected at a pivot location, with the first section configured to collapse into the second section when folded. A first crossbar system couples distal ends of the upper brackets together. A second crossbar system couples distal ends of the lower brackets together. A third crossbar system at the pivot location couples proximal ends of both sections. An adjustment module coupled to the third crossbar system controls graduated rotation of the first section relative to the second section around the pivot location.

20 Claims, 11 Drawing Sheets

COLLAPSIBLE THIGH SUPPORT APPARATUS FOR STRINGED INSTRUMENTS

CROSS-REFERENCE TO RELATED APPLICATIONS

This application claims priority to U.S. Application No. application No. 63/766,153, filed Mar. 3, 2025, which is hereby incorporated by reference in its entirety.

FIELD OF INVENTION

The present disclosure relates to musical instrument accessories, and more particularly to a collapsible thigh support apparatus for supporting stringed instruments during seated playing.

BACKGROUND

Musicians who play stringed instruments, such as guitars, often perform while seated. When playing from a seated position, guitarists typically rest the instrument body on one of their legs to provide support and stability during performance. This arrangement allows the musician to have both hands free for playing while the instrument remains in a comfortable and accessible position.

Conventional approaches to supporting a guitar while seated may involve elevating one leg, often by placing a foot on a footstool or similar elevated surface. This leg elevation raises the thigh to a position that can support the guitar body at a suitable height and angle for playing. However, maintaining an elevated leg position for extended periods can lead to discomfort, fatigue, or strain on the hip, knee, and ankle joints.

Various support devices have been developed to address the challenges associated with seated guitar playing. These devices, sometimes referred to as thigh supports or leg rests, are designed to support the guitar body on top of the player's thigh without requiring leg elevation. Such devices allow both of the player's feet to remain on the floor in a natural position while still positioning the guitar at an appropriate height and angle for comfortable playing.

Existing thigh support devices may present certain limitations. Some devices may lack adjustability, making them suitable for instruments of particular sizes or shapes while being less accommodating to the wide variety of guitar body configurations available. Acoustic guitars, electric guitars, and classical guitars, for example, can vary considerably in body width, depth, and contour. A support device that cannot adapt to these variations may provide suboptimal support or positioning for certain instruments.

Portability and storage considerations also present challenges for thigh support devices. Musicians who travel to performances or practice sessions may prefer compact accessories that can be easily transported alongside their instruments. Devices currently available in the market cannot be reduced to a smaller form factor for storage, and this may be less convenient for musicians who frequently move between locations.

Accordingly, there exists a general interest in thigh support apparatus designs that offer adaptability to accommodate various instrument sizes and shapes, while also providing convenient storage and transport characteristics.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a thigh support apparatus is provided. The thigh support apparatus includes a first section of brackets comprising a first upper bracket and a second upper bracket arranged parallel to each other. The thigh support apparatus includes a second section of brackets comprising a first lower bracket and a second lower bracket arranged parallel to each other. The first section of brackets and the second section of brackets are connected at a pivot location. The first section of brackets is configured to collapse into the second section of brackets when the apparatus is in a folded state. A first crossbar system couples distal ends of the first upper bracket and the second upper bracket together. A second crossbar system couples distal ends of the first lower bracket and the second lower bracket together. A third crossbar system is positioned at the pivot location and couples proximal ends of the first section of brackets to proximal ends of the second section of brackets. An adjustment module is coupled to the third crossbar system and controls graduated rotation of the first section of brackets relative to the second section of brackets around the pivot location.

According to another aspect of the present disclosure, a thigh support apparatus for supporting a stringed instrument is disclosed. The thigh support apparatus includes an upper bracket section comprising a pair of upper brackets arranged parallel to each other. A lower bracket section comprises a pair of lower brackets arranged parallel to each other. The upper bracket section is pivotally connected to the lower bracket section at a pivot location. A plurality of crossbar systems are included. Each crossbar system comprises a crossbar sleeve surrounding at least two crossbar members configured to telescope relative to each other to adjust a lateral distance between brackets. A ratchet and pawl mechanism is coupled to the pivot location and configured to lock the upper bracket section and the lower bracket section at a selected angle of separation.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

As will be appreciated, embodiments disclosed herein provide a thigh support apparatus that provides a fastener-free platform with customizable positioning for stringed instruments. The thigh support apparatus may allow musicians to play stringed instruments, such as guitars, in a seated position without requiring elevation of the leg on which the instrument rests. In some cases, the thigh support apparatus may support the stringed instrument on top of a user's thigh, enabling both legs to remain in a horizontal position during playing.

The thigh support apparatus may include collapsible bracket sections that fold relative to each other. In some cases, an upper bracket section may be configured to nest within a lower bracket section when the apparatus is in a folded or collapsed state. The collapsible configuration may facilitate storage and transport of the thigh support apparatus. Telescoping crossbar systems enable lateral width adjustment. The telescoping crossbar systems may allow the apparatus to accommodate stringed instruments of varying widths, including wider-bodied acoustic guitars and narrower-bodied electric guitars. In some cases, crossbar members within the crossbar systems may slide relative to each other to expand or contract the lateral distance between brackets.

The thigh support apparatus may include an adjustment module for controlling angular positioning between the bracket sections. The adjustment module may enable graduated rotation of the bracket sections around a pivot location. In some cases, the adjustment module may include a ratchet and pawl mechanism that locks the bracket sections at a desired angle of separation. The angular adjustment may accommodate different stringed instrument shapes and user preferences for instrument orientation during playing.

Definitions

Unfolded or Expanded, as used herein, refers to the apparatus having one section rotated open and away from another section.

Folded or Collapsed, as used herein, refers to the apparatus having both sections rotated toward each other.

Compact, as used herein, refers to the lateral members of the apparatus being pushed toward each other in a default state.

Telescoped, as used herein, refers to the lateral members of the apparatus being separated from each other from the default state.

Figure 1:
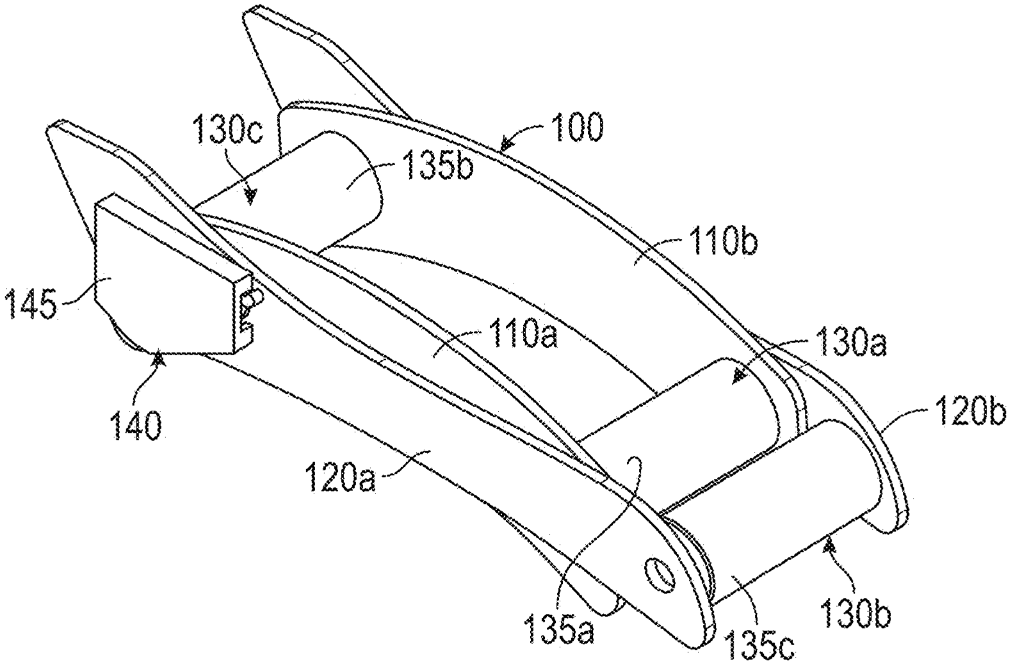
FIG. 1 is a perspective view of a thigh support apparatus in a folded state and compact, according to aspects of the present disclosure.
Figure 2:
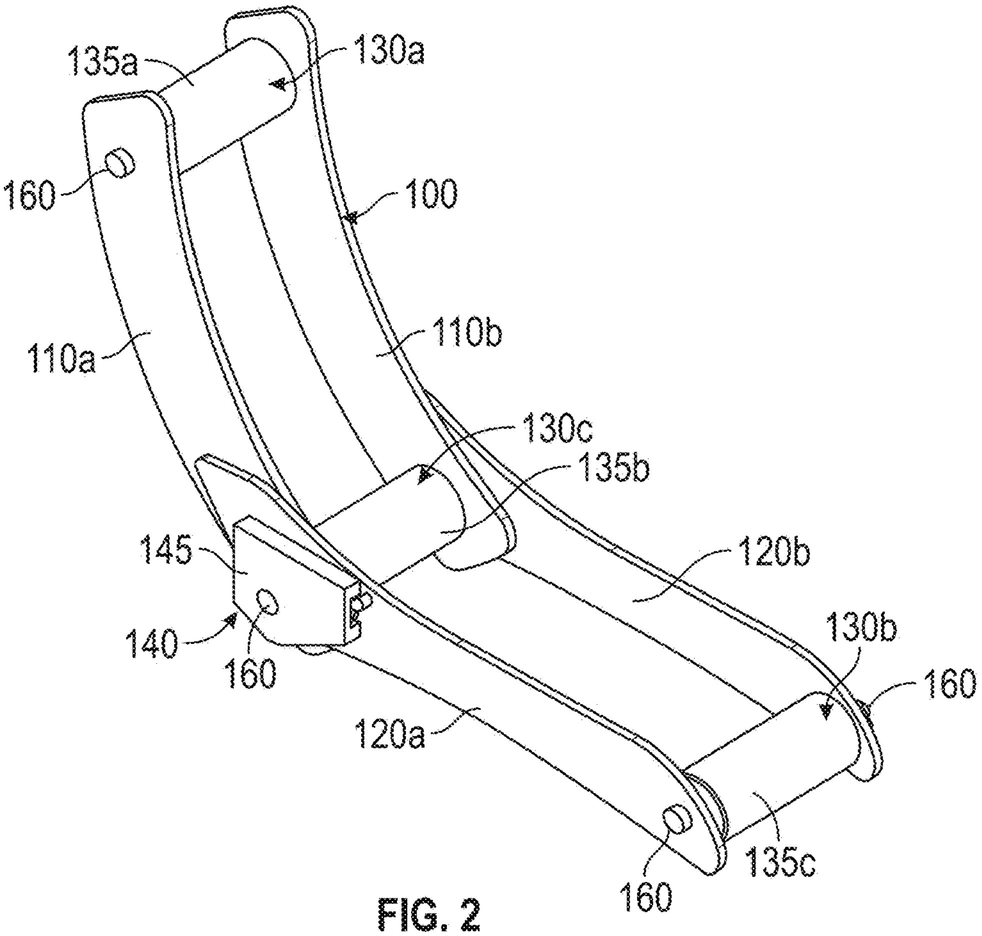
FIG. 2 is a perspective view of the thigh support apparatus of FIG. 1 in an expanded and compact state, according to aspects of the present disclosure.

Referring now to FIGS. 1 and 2, a thigh support apparatus 100 is shown in different states. FIG. 1 illustrates the thigh support apparatus 100 in a folded or collapsed and compact state, while FIG. 2 illustrates the thigh support apparatus 100 in an unfolded, open, and compact state. The thigh support apparatus 100 may be collapsed into the folded or compact state for storing or transporting the thigh support apparatus 100.

The thigh support apparatus 100 may include a first upper bracket 110*a* and a second upper bracket 110*b* forming an upper section. The thigh support apparatus 100 may also include a first lower bracket 120*a* and a second lower bracket 120*b* forming a lower section. The first upper bracket 110*a* and the second upper bracket 110*b* may be designed to be narrower than the first lower bracket 120*a* and the second lower bracket 120*b*. This configuration may allow the first upper bracket 110*a* and the second upper bracket 110*b* to be surrounded by the first lower bracket 120*a* and the second lower bracket 120*b* when the thigh support apparatus 100 is in the folded state, as shown in FIG. 1.

With continued reference to FIGS. 1 and 2, distal ends of the first upper bracket 110*a* and the second upper bracket 110*b* may be coupled together by a first crossbar system 130*a*. The first crossbar system 130*a* may include a first crossbar sleeve 135*a*. Distal ends of the first lower bracket 120*a* and the second lower bracket 120*b* may be coupled together by a second crossbar system 130b. The second crossbar system 130b may include a crossbar sleeve 135b.

Proximal ends of the first upper bracket 110a and the second upper bracket 110b may be joined to proximal ends of the first lower bracket 120a and the second lower bracket 120b at a pivot location. A third crossbar system 130c may be positioned at the pivot location. The third crossbar system 130c may include a third crossbar sleeve 135c. A pivot pin 160 may enable the upper section and the lower section to pivot relative to each other around the third crossbar system 130c.

An adjustment module 140 may be coupled to the third crossbar system 130c. The adjustment module 140 may be covered by an enclosure 145. The adjustment module 140 may control graduated rotation of the first upper bracket 110a and the second upper bracket 110b in and out from the collapsed position around the third crossbar system 130c. As shown in FIG. 2, when the thigh support apparatus 100 is in the open or expanded state, the first upper bracket 110a and the second upper bracket 110b may be rotated away from the first lower bracket 120a and the second lower bracket 120b about the pivot pin 160, creating separation between the upper section and the lower section suitable for supporting a stringed instrument.

In some embodiments, the first crossbar sleeve 135a, the crossbar sleeve 135b, and the third crossbar sleeve 135c may be covered by a rubber sheath or layer. The rubber sheath or layer may provide comfort to the user by cushioning contact between the thigh support apparatus 100 and the user's thigh. The rubber sheath or layer may also protect the thigh from pressure or discomfort during extended playing sessions. In some cases, the rubber sheath or layer may protect the exterior surface of the stringed instrument being supported by preventing scratches or damage to the instrument finish where the instrument contacts the crossbar sleeves. The rubber sheath or layer may provide sufficient friction for the stringed instrument to remain in position for the duration of play, reducing the likelihood of the instrument sliding or shifting on the crossbar sleeves during use.

Figure 3:
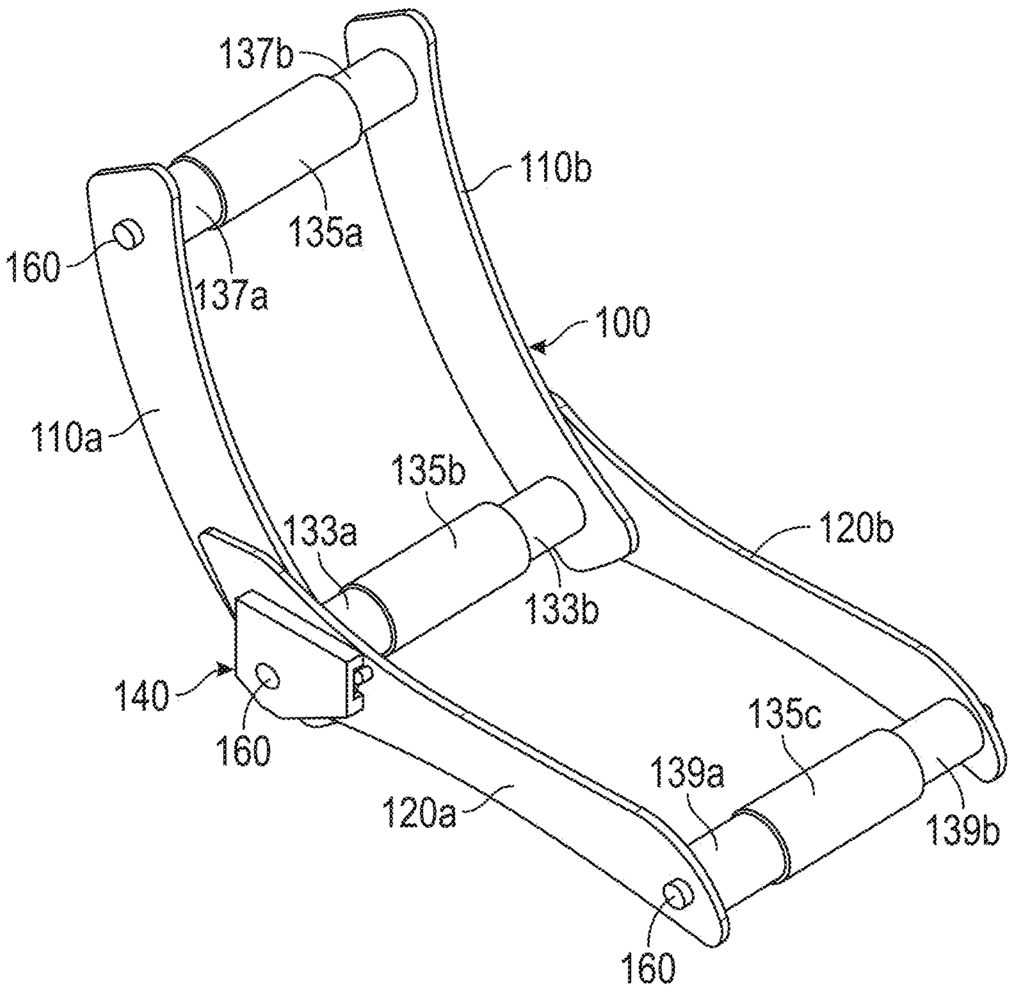
FIG. 3 is a perspective view of the thigh support apparatus of FIG. 1 in an expanded and telescoped state, according to aspects of the present disclosure.
Figure 4:
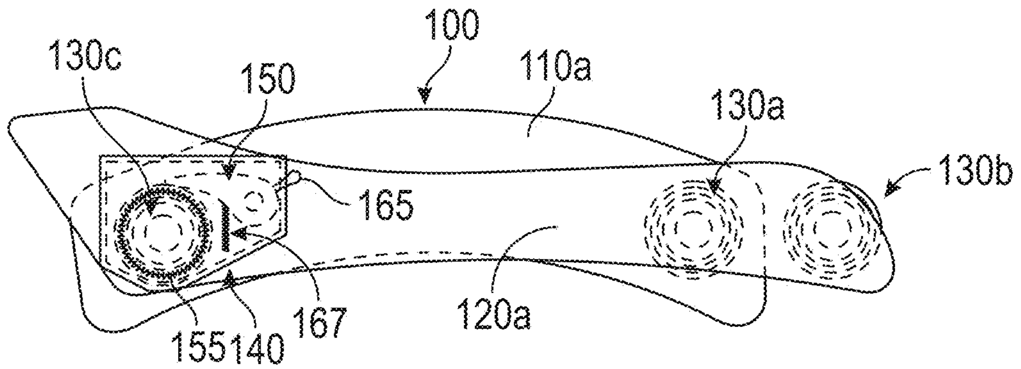
FIG. 4 is a left hand view of the thigh support apparatus of FIG. 1 in a folded state, according to aspects of the present disclosure.

Referring to FIGS. 3 and 4, the thigh support apparatus 100 is shown in an expanded and telescoped state in FIG. 3 and in a left hand view in a folded or collapsed state in FIG. 4. The thigh support apparatus 100 may include telescoping crossbar members within each crossbar system that enable lateral width adjustment of the thigh support apparatus 100.

The third crossbar system 130c may include a first pivot crossbar member 133a and a second pivot crossbar member 133b housed within the third crossbar sleeve 135c. The first pivot crossbar member 133a may be configured to telescope relative to the second pivot crossbar member 133b. In some cases, the first pivot crossbar member 133a may slide away from the second pivot crossbar member 133b to expand the lateral width of the thigh support apparatus 100 at the pivot location.

The first crossbar system 130a may include a first crossbar member 137a and a second crossbar member 137b housed within the first crossbar sleeve 135a. The first crossbar member 137a may be configured to telescope relative to the second crossbar member 137b. The second crossbar system 130b may include a third crossbar member 139a and a fourth crossbar member 139b housed within the crossbar sleeve 135b. The third crossbar member 139a may be configured to telescope relative to the fourth crossbar member 139b.

To expand the width of the thigh support apparatus 100, the first crossbar member 137a, the third crossbar member 139a, and the first pivot crossbar member 133a may be telescoped away from the second crossbar member 137b, the fourth crossbar member 139b, and the second pivot crossbar member 133b, respectively. In some cases, the crossbar members may be manually pulled to achieve the telescoped configuration. The telescoping action of the first crossbar system 130a, the second crossbar system 130b, and the third crossbar system 130c may provide users with a distribution of force on a smaller or larger area of the thigh as is comfortable for the individual user. The ability to vary the lateral distance between brackets may allow different size stringed instrument bodies, or other instruments of varying widths, to be accommodated.

As further shown in FIGS. 3 and 4, the adjustment module 140 may include a spring-loaded pawl system 150 and a ratchet gear 155 to control graduated movement of the first upper bracket 110a, the second upper bracket 110b, the first lower bracket 120a, and the second lower bracket 120b around the pivot pin 160 coupled to the third crossbar system 130c. The ratchet gear 155 may be a coil spring-loaded ratchet gear that works with the spring-loaded pawl system 150 to control graduated movement of the brackets.

A lever 165 may be connected to or integrated with the spring-loaded pawl system 150. A spring 167 may bias the spring-loaded pawl system 150 into engagement with teeth present on the ratchet gear 155. Depressing the lever 165 may release the spring-loaded pawl system 150 from engagement with the teeth of the ratchet gear 155, freeing the first upper bracket 110a and the second upper bracket 110b to move about the pivot pin 160 relative to the first lower bracket 120a and the second lower bracket 120b until a desired separation of the brackets is reached. Releasing the lever 165 may re-engage the spring-loaded pawl system 150 with the teeth of the ratchet gear 155, locking the first upper bracket 110a, the second upper bracket 110b, the first lower bracket 120a, and the second lower bracket 120b into place. The graduated rotation may help adjust the spacing between brackets to a desired angle to suit different shapes of different stringed instruments when resting the stringed instruments on the first crossbar sleeve 135a and the crossbar sleeve 135b.

Figure 5:
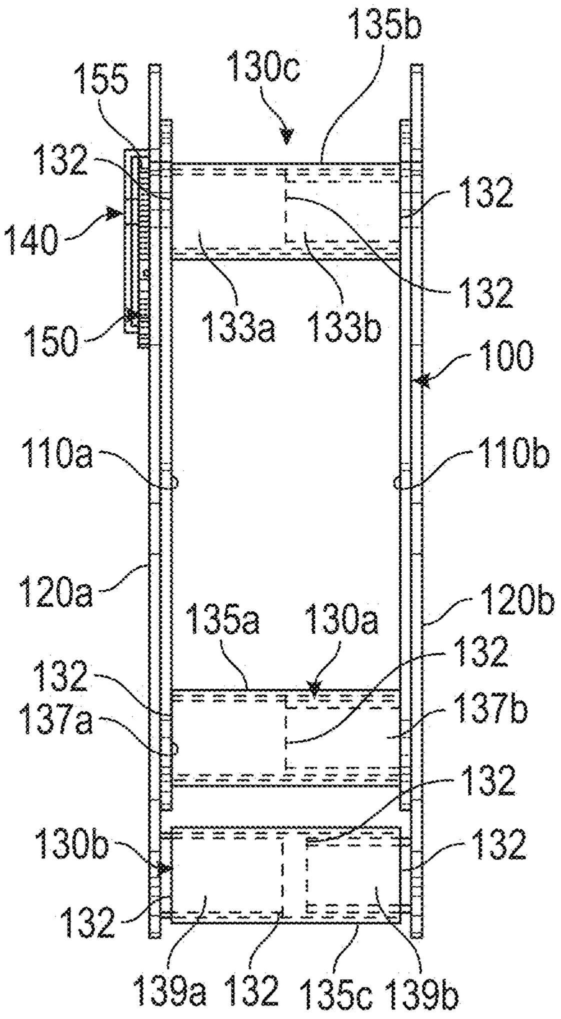
FIG. 5 is a top view of the thigh support apparatus of FIG. 1 in a folded and compact state, according to aspects of the present disclosure.
Figure 6:
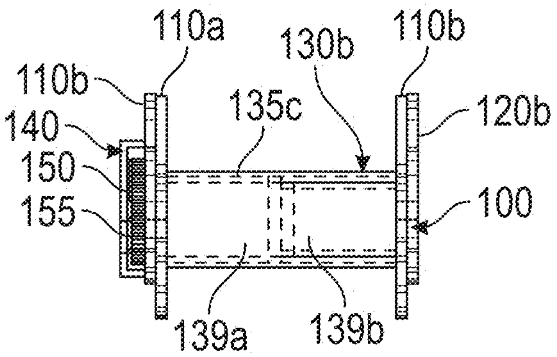
FIG. 6 is a front view of the thigh support apparatus of FIG. 1 in a folded and compact state, according to aspects of the present disclosure.

Referring to FIG. 5, a top view of the thigh support apparatus 100 in the folded and compact state is shown. From the top view, the parallel arrangement of the first upper bracket 110a and the second upper bracket 110b is visible, along with the parallel arrangement of the first lower bracket 120a and the second lower bracket 120b. The first upper bracket 110a and the second upper bracket 110b are connected at their distal ends by the first crossbar system 130a, which includes the first crossbar sleeve 135a housing the first crossbar member 137a and the second crossbar member 137b. The first lower bracket 120a and the second lower bracket 120b are connected at their distal ends by the second crossbar system 130b, which includes the crossbar sleeve 135b containing the third crossbar member 139a and the fourth crossbar member 139b. The third crossbar system 130c connects the proximal ends of the upper and lower brackets at the pivot location, with the third crossbar sleeve 135b housing the first pivot crossbar member 133a and the second pivot crossbar member 133b.

With continued reference to FIG. 5, the spatial relationships between the crossbar systems are illustrated. The first crossbar system 130a is positioned at the distal ends of the upper brackets, the second crossbar system 130b is positioned at the distal ends of the lower brackets, and the third crossbar system 130c is positioned at the pivot location where the proximal ends of the brackets connect. The adjustment module 140 is coupled to the third crossbar system 130*c* and includes the spring-loaded pawl system 150 and the ratchet gear 155 that control the graduated rotation of the brackets around the pivot location.

As further shown in FIG. 5, the crossbar members and crossbar sleeves may include a lip detent mechanism to prevent complete separation when the crossbar members are telescoped. The first crossbar member 137*a* and the second crossbar member 137*b* may have a lip 132 on their ends turned outward. Similarly, the third crossbar member 139*a* and the fourth crossbar member 139*b* may have a lip 132 on their ends turned outward, and the first pivot crossbar member 133*a* and the second pivot crossbar member 133*b* may have a lip 132 on their ends turned outward. The first crossbar sleeve 135*a*, the crossbar sleeve 135*b*, and the third crossbar sleeve 135*c* may have a lip 132 on their ends turned inward. The lips 132 of the crossbar members and the lips 132 of the respective crossbar sleeves on the same axis may form a detent. For sake of illustration, only crossbar members 139*a* and 139*b* and sleeve 135*c* have lips 132 called out, but it will be understood that the other crossbar members and sleeves have them present. When the crossbar members slide out from each other during telescoping, the crossbar members may slide out until the respective lips of the crossbar members engage the lips of the respective crossbar sleeves. At this point, the lips may lock to prevent the crossbar members from being pulled out altogether from the crossbar sleeves.

Figure 7:
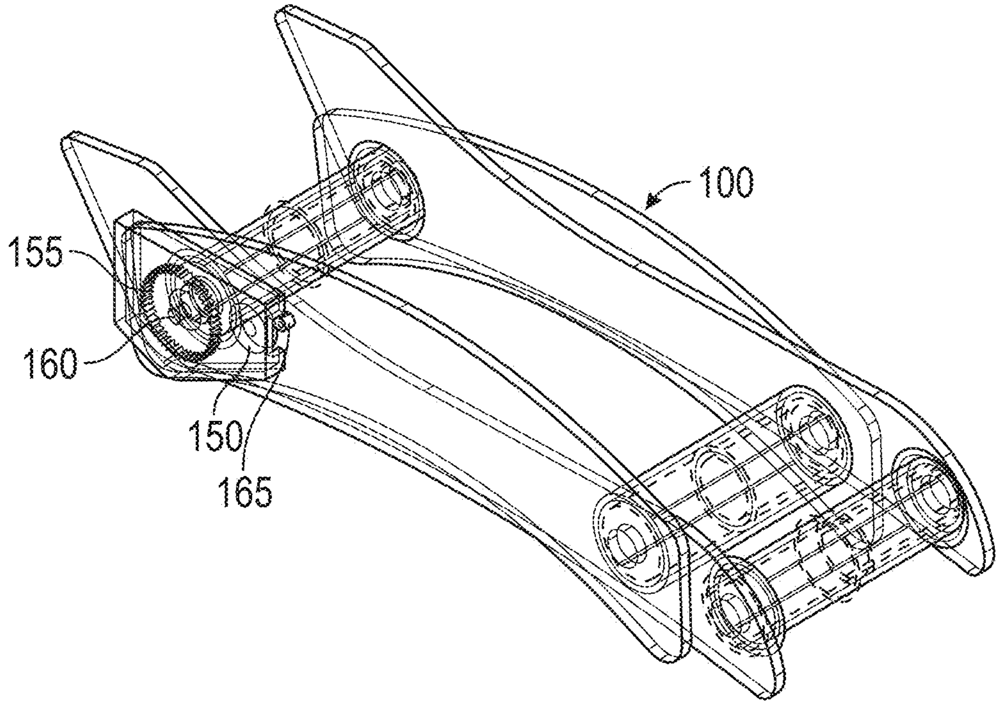
FIG. 7 is an isometric view of the thigh support apparatus of FIG. 1 in a folded and compact state, according to aspects of the present disclosure.
Figure 8:
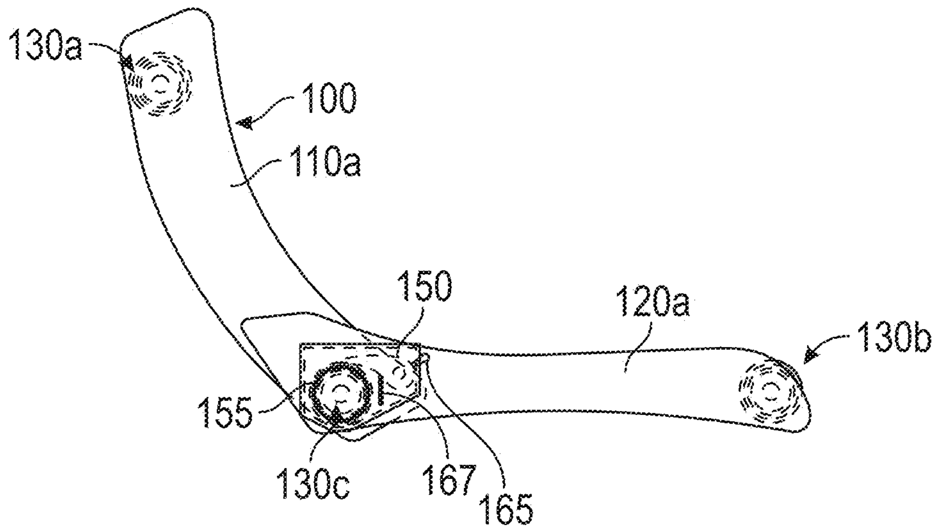
FIG. 8 is a left hand view of the thigh support apparatus of FIG. 1 in an expanded state, according to aspects of the present disclosure.

Referring to FIGS. 7 and 8, isometric and left hand views of the thigh support apparatus 100 are shown illustrating the rotation mechanism in detail. FIG. 7 illustrates an isometric view of the thigh support apparatus 100 in the folded and compact state. FIG. 8 shows the apparatus 100 in the expanded state. With continued reference to FIGS. 7 and 8, the rotation mechanism may control the angular positioning between the upper section and the lower section of the thigh support apparatus 100. The spring-loaded pawl system 150 may be positioned at the pivot location and may engage with teeth present on the ratchet gear 155. The spring 167 may bias the spring-loaded pawl system 150 into engagement with the ratchet gear 155, maintaining the first upper bracket 110*a* and the second upper bracket 110*b* at a fixed angular position relative to the first lower bracket 120*a* and the second lower bracket 120*b*.

As further shown in FIGS. 7 and 8, the lever 165 may extend from the spring-loaded pawl system 150 and may be accessible to a user for adjusting the angular separation between the bracket sections. When the lever 165 is depressed, the spring-loaded pawl system 150 may be released from engagement with the teeth of the ratchet gear 155. This release may free the first upper bracket 110*a* and the second upper bracket 110*b* to rotate about the pivot pin 160 relative to the first lower bracket 120*a* and the second lower bracket 120*b*.

The first upper bracket 110*a*, the second upper bracket 110*b*, the first lower bracket 120*a*, and the second lower bracket 120*b* may swing from a closed horizontal position to a maximum angle of approximately 150 degrees. This range of angular adjustment may accommodate various stringed instrument shapes, including different guitar body configurations. When the desired angle of separation is reached, releasing the lever 165 may allow the spring 167 to bias the spring-loaded pawl system 150 back into engagement with the teeth of the ratchet gear 155, locking the brackets at the selected angular position.

Figure 10:
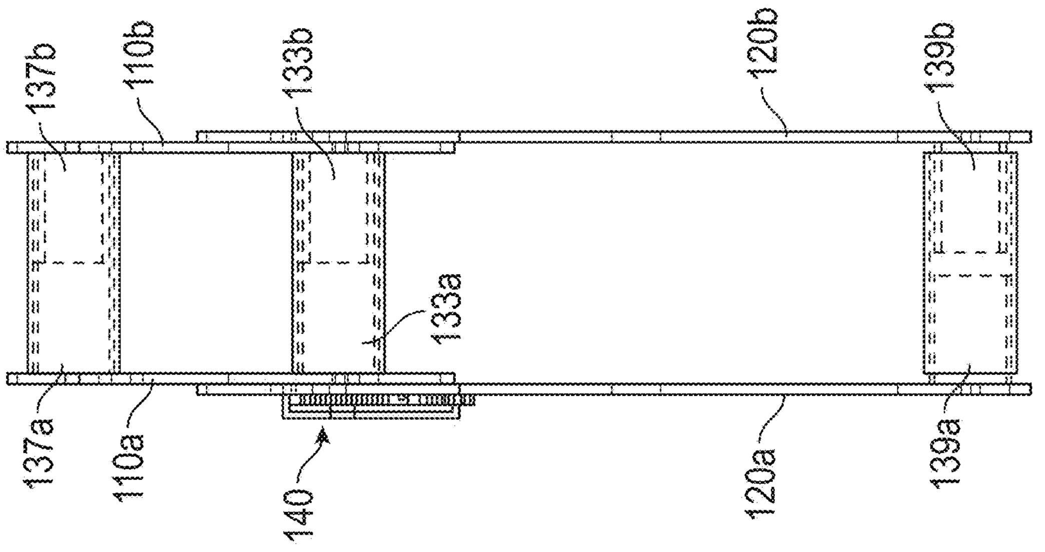
FIG. 10 is a top view of the thigh support apparatus of FIG. 1 in an expanded and compact state, according to aspects of the present disclosure.
Figure 9:
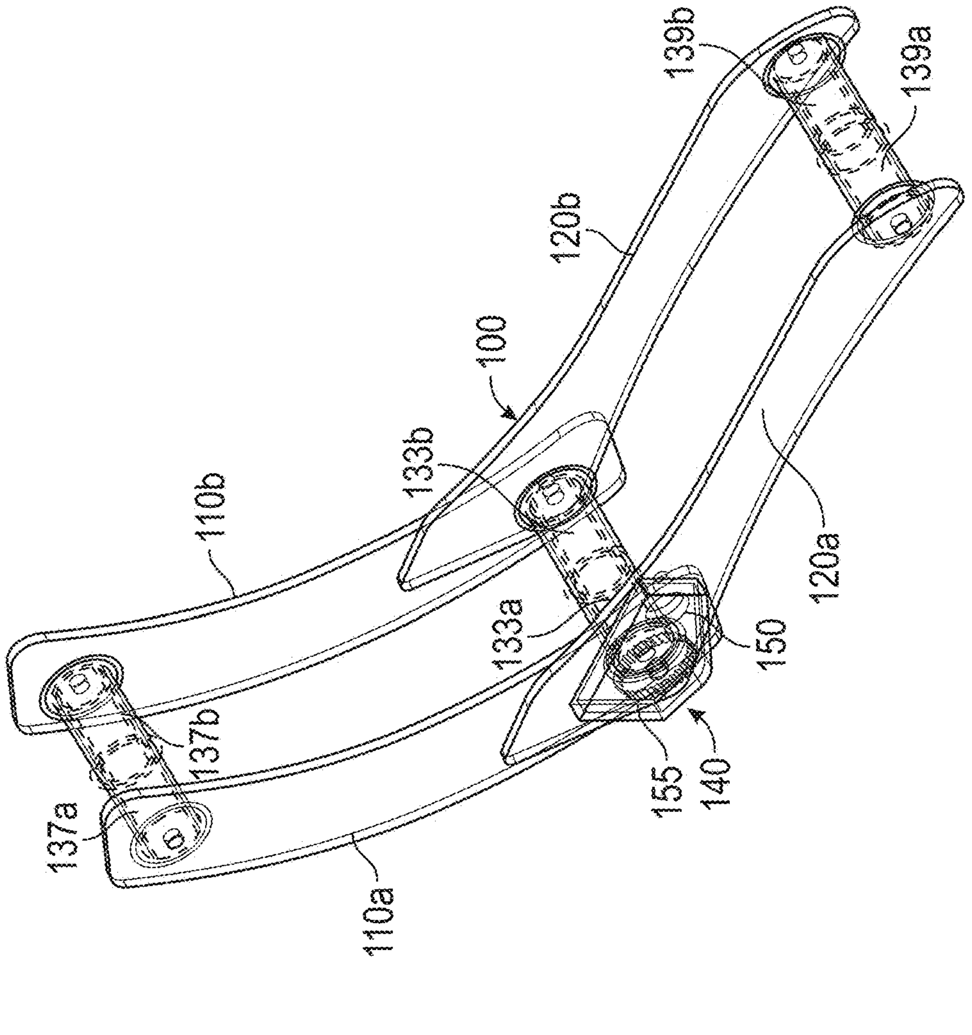
FIG. 9 is an isometric view of the thigh support apparatus of FIG. 1 in an expanded state, according to aspects of the present disclosure.

Referring to FIGS. 9 and 10, the thigh support apparatus 100 is shown in the expanded and compact state. FIG. 9 illustrates an isometric view of the thigh support apparatus 100, while FIG. 10 illustrates a top view of the thigh support apparatus 100. In the expanded state, the upper section comprising the first upper bracket 110*a* and the second upper bracket 110*b* is separated from the lower section comprising the first lower bracket 120*a* and the second lower bracket 120*b*, creating a configuration suitable for supporting a stringed instrument.

The first upper bracket 110*a* and the second upper bracket 110*b* may exhibit a curved profile. The curved profile of the first upper bracket 110*a* and the second upper bracket 110*b* may accommodate different guitar body shapes. In some cases, the curvature of the first upper bracket 110*a* and the second upper bracket 110*b* may allow the upper section to conform to contours present on various stringed instrument bodies, including acoustic guitars and electric guitars with different body configurations.

As further shown in FIGS. 9 and 10, the first lower bracket 120*a* and the second lower bracket 120*b* may have a bottom edge with curvature. The curvature of the bottom edge of the first lower bracket 120*a* and the second lower bracket 120*b* may be less pronounced than the curvature of the first upper bracket 110*a* and the second upper bracket 110*b*. The bottom edge curvature of the first lower bracket 120*a* and the second lower bracket 120*b* may conform generally to the curvature of a user's top-side of the thigh. This conforming curvature may provide a stable resting surface when the thigh support apparatus 100 is positioned on a user's thigh during playing. The spatial relationship between the curved upper brackets and the thigh-conforming lower brackets is visible in the top view of FIG. 10, which illustrates the parallel arrangement of the bracket sections in the expanded configuration.

Figure 11:
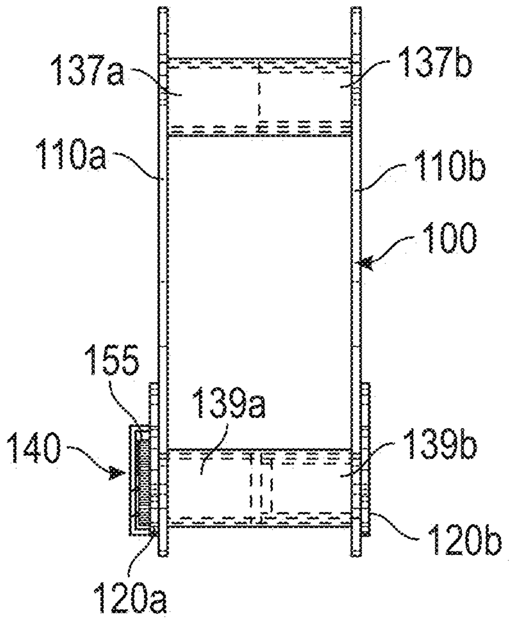
FIG. 11 is a front view of the thigh support apparatus of FIG. 1 in an expanded and compact state, according to aspects of the present disclosure.
Figure 12:
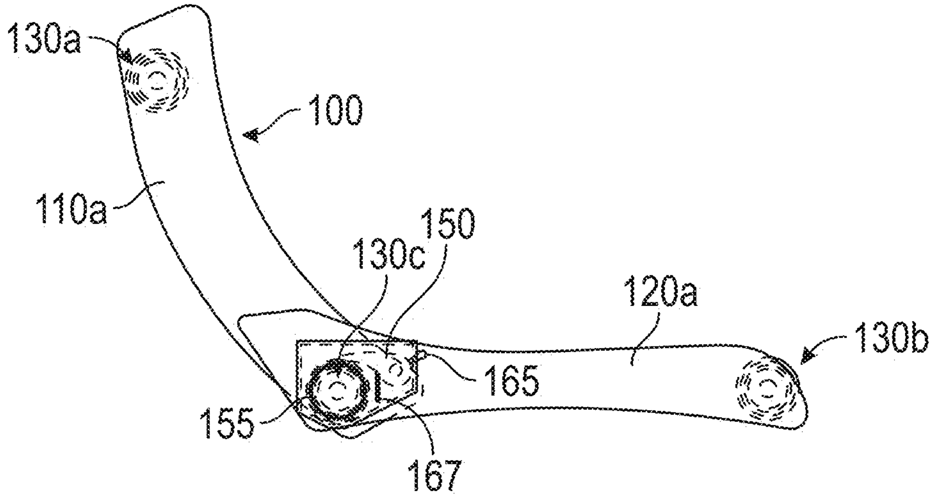
FIG. 12 is a left hand view of the thigh support apparatus of FIG. 1 in the expanded state, according to aspects of the present disclosure.

Referring now to FIG. 11 and FIG. 12, a front view and side view of the thigh support apparatus 100 in the expanded and compact state is shown. The front view illustrates the spatial arrangement of the crossbar members within the crossbar sleeves. The first crossbar system 130*a* is visible at the distal ends of the first upper bracket 110*a* and the second upper bracket 110*b*, with the first crossbar member 137*a* and the second crossbar member 137*b* positioned within the first crossbar sleeve 135*a*. The second crossbar system 130*b* is visible at the distal ends of the first lower bracket 120*a* and the second lower bracket 120*b*, with the third crossbar member 139*a* and the fourth crossbar member 139*b* positioned within the crossbar sleeve 135*b*. The third crossbar system 130*c* is positioned at the pivot location connecting the proximal ends of the upper and lower brackets.

With continued reference to FIG. 11, the front view demonstrates the internal positioning of the crossbar members within the respective crossbar sleeves. The first crossbar member 137*a* and the second crossbar member 137*b* are shown with dashed lines indicating their internal positioning within the first crossbar sleeve 135*a*. Similarly, the third crossbar member 139*a* and the fourth crossbar member 139*b* are visible within the crossbar sleeve 135*b*. The adjustment module 140 is coupled to the third crossbar system 130*c* and includes the ratchet gear 155 for controlling graduated rotation of the brackets around the pivot location. FIG. 12 shows the relative concentric position of crossbar members and sleeves that can be seen from the side.

Figure 13:
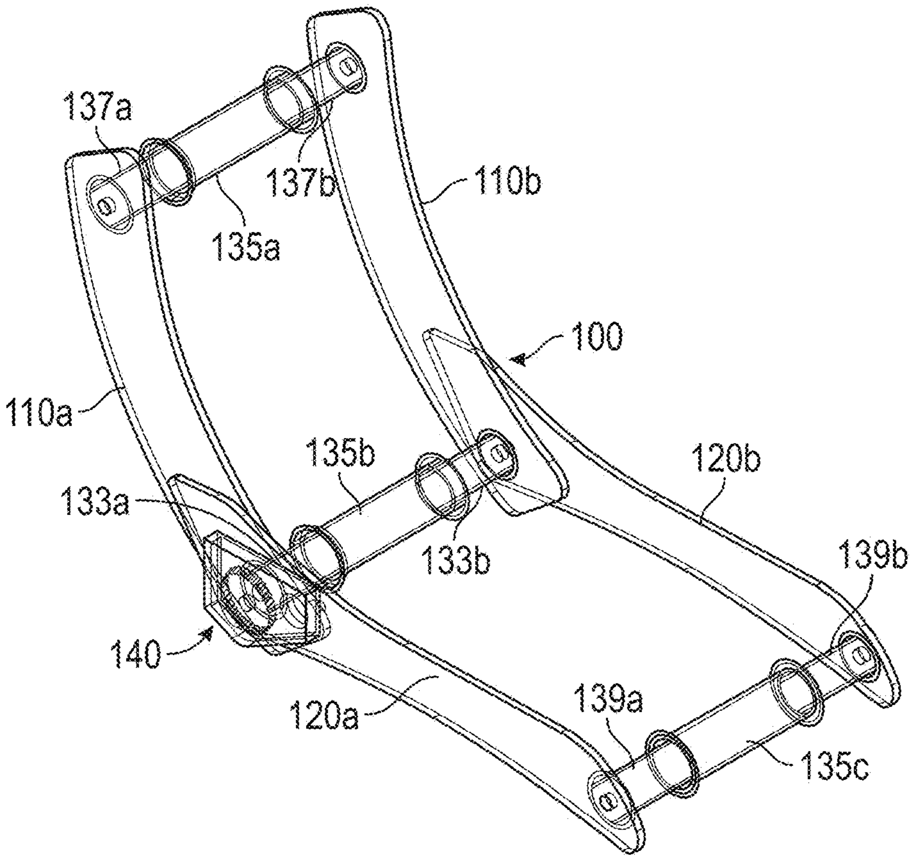
FIG. 13 is an isometric view of the thigh support apparatus of FIG. 1 in the expanded and telescoped state, according to aspects of the present disclosure.
Figure 14:
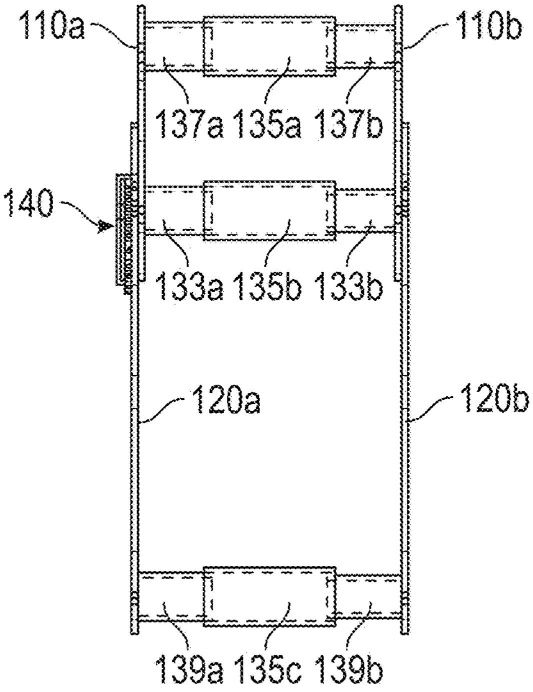
FIG. 14 is a top view of the thigh support apparatus of FIG. 1 in the expanded and telescoped state, according to aspects of the present disclosure.

Referring to FIGS. 13 and 14, the thigh support apparatus 100 is shown in an expanded and telescoped state. When telescoped, the lateral elements (110*a*, 110*b*, 120*a*, and 120*b*) are laterally expanded or widened from each other. FIG. 13 illustrates an isometric view of the thigh support apparatus 100 in the expanded and telescoped state, while FIG. 14 illustrates a top view of the thigh support apparatus

100 in the in the expanded and telescoped state. In the telescoped state, the crossbar members within each crossbar system have been telescoped apart to increase the lateral distance between the brackets.

With continued reference to FIGS. 13 and 14, the first crossbar member 137*a* and the second crossbar member 137*b* have been telescoped apart within the first crossbar sleeve 135*a*. The telescoping of the first crossbar member 137*a* away from the second crossbar member 137*b* increases the lateral distance between the first upper bracket 110*a* and the second upper bracket 110*b*. Similarly, the third crossbar member 139*a* and the fourth crossbar member 139*b* have been telescoped apart within the crossbar sleeve 135*b*, increasing the lateral distance between the first lower bracket 120*a* and the second lower bracket 120*b*. At the pivot location, the first pivot crossbar member 133*a* and the second pivot crossbar member 133*b* have been telescoped apart within the third crossbar sleeve 135*c*.

As further shown in FIGS. 13 and 14, the telescoping action of the first crossbar system 130*a*, the second crossbar system 130*b*, and the third crossbar system 130*c* may provide users with a distribution of force on a smaller or larger area of the thigh as is comfortable for the individual user. When the crossbar members are telescoped apart to the laterally expanded state, the thigh support apparatus 100 may distribute the weight of the stringed instrument over a larger area of the user's thigh. When the crossbar members are positioned closer together in a contracted state, the thigh support apparatus 100 may concentrate the weight of the stringed instrument over a smaller area of the user's thigh. The user may adjust the lateral width of the thigh support apparatus 100 by telescoping the crossbar members to achieve a force distribution that is comfortable for the individual user during playing sessions.

Figure 15:
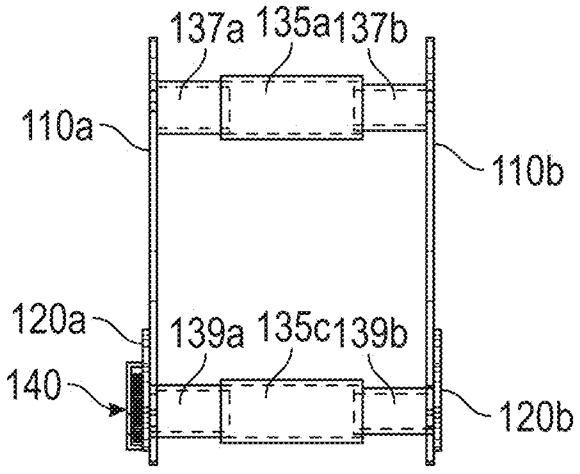
FIG. 15 is a front view of the thigh support apparatus of FIG. 1 in the expanded and telescoped state, according to aspects of the present disclosure.
Figure 16:
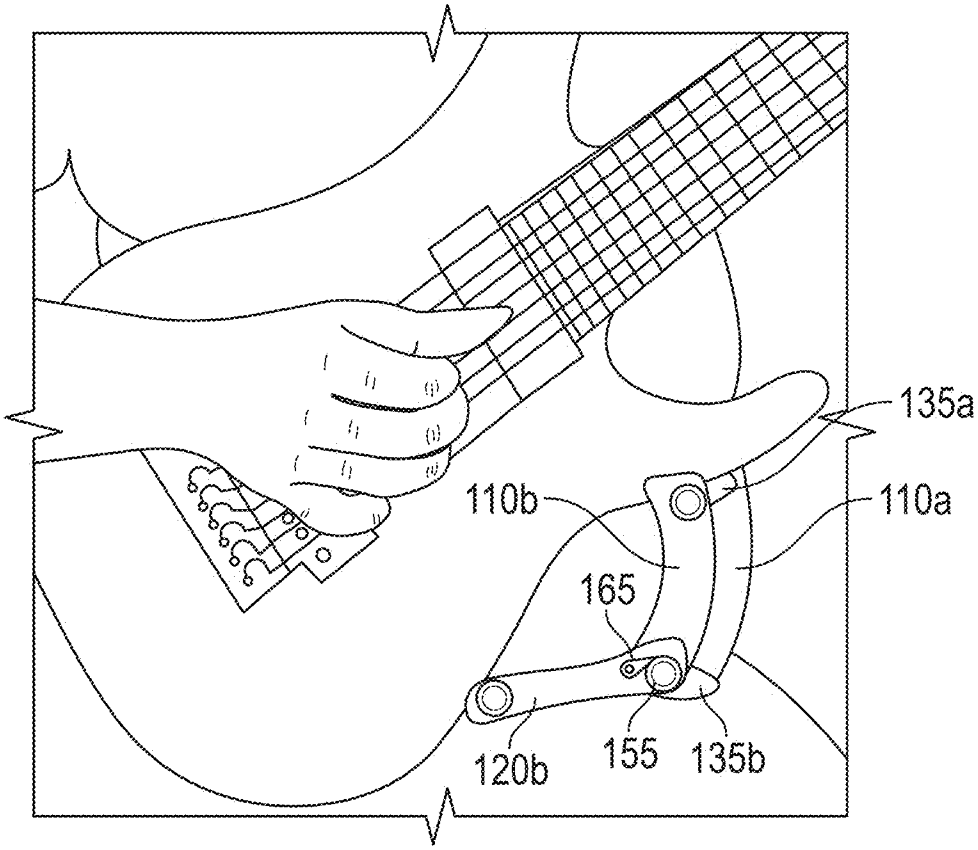
FIG. 16 illustrates a side view of the thigh support apparatus of FIG. 1, expanded and supporting a guitar on a user's thigh, according to aspects of the present disclosure.

Referring to FIGS. 15 and 16, the thigh support apparatus 100 is shown in a front view in the telescoped state in FIG. 15, and in use supporting a guitar on top of a user's thigh in FIG. 16. FIG. 15 illustrates the spatial arrangement of the brackets and crossbar systems when the thigh support apparatus 100 has been telescoped to accommodate wider stringed instruments. The first upper bracket 110*a* and the second upper bracket 110*b* are positioned in the upper section, while the first lower bracket 120*a* and the second lower bracket 120*b* are positioned in the lower section. The first crossbar sleeve 135*a* couples the distal ends of the first upper bracket 110*a* and the second upper bracket 110*b*, with the first crossbar member 137*a* and the second crossbar member 137*b* telescoped apart within the first crossbar sleeve 135*a*. The crossbar sleeve 135*b* couples the distal ends of the first lower bracket 120*a* and the second lower bracket 120*b*, with the third crossbar member 139*a* and the fourth crossbar member 139*b* telescoped apart within the crossbar sleeve 135*b*. The third crossbar sleeve 135*c* is positioned at the pivot location, and the adjustment module 140 is coupled to the third crossbar sleeve 135*c* with the ratchet gear 155 and the lever 165 visible for controlling the angular separation between the bracket sections.

With continued reference to FIGS. 15 and 16, the lateral width adjustment (telescoped state) of the thigh support apparatus 100 may accommodate stringed instruments of varying widths. The thigh support apparatus 100 may be usable for guitars and other stringed instruments, including acoustic guitars with wider bodies and electric guitars with narrow bodies. When supporting wider-bodied acoustic guitars, the first crossbar member 137*a* and the second crossbar member 137*b* may be telescoped further apart within the first crossbar sleeve 135*a*, and the third crossbar member 139*a* and the fourth crossbar member 139*b* may be telescoped further apart within the crossbar sleeve 135*b*. This expanded configuration may increase the lateral distance between the first upper bracket 110*a* and the second upper bracket 110*b*, as well as between the first lower bracket 120*a* and the second lower bracket 120*b*, to accommodate the wider body of an acoustic guitar. When supporting narrower-bodied electric guitars, the crossbar members may be positioned closer together within the respective crossbar sleeves, reducing the lateral distance between the brackets to conform to the narrower body of an electric guitar.

As further shown in FIG. 16, the thigh support apparatus 100 is depicted in use with the lower section resting on top of a user's thigh and a guitar body supported by the crossbar sleeves. The first lower bracket 120*a* and the second lower bracket 120*b* may rest on the user's thigh, with the bottom edge curvature of the first lower bracket 120*a* and the second lower bracket 120*b* conforming to the top-side of the user's thigh. One point of the guitar body may be laid on top of the first crossbar sleeve 135*a*, and a second point of the guitar body may be rested on top of the crossbar sleeve 135*b*. In some cases, an upper (and sometimes narrower) part of the guitar body may contact the first crossbar sleeve 135*a*, while a lower (and sometimes wider) part of the guitar body may contact the crossbar sleeve 135*b*. the telescoping action of crossbar sleeve 135*a* that telescopes independently from crossbar sleeve 135*b* allows for guitars with non-uniform sections of width to be accommodated within the apparatus 100 without conflict between the upper and lower sections that hold the guitar. The ratchet gear 155 and the lever 165 remain accessible to the user for adjusting the angular separation between the upper section and the lower section to suit the shape of the guitar being supported. The configuration shown in FIG. 16 demonstrates the thigh support apparatus 100 providing a fastener-free platform for supporting the guitar on the user's thigh during seated playing.

Figure 17:
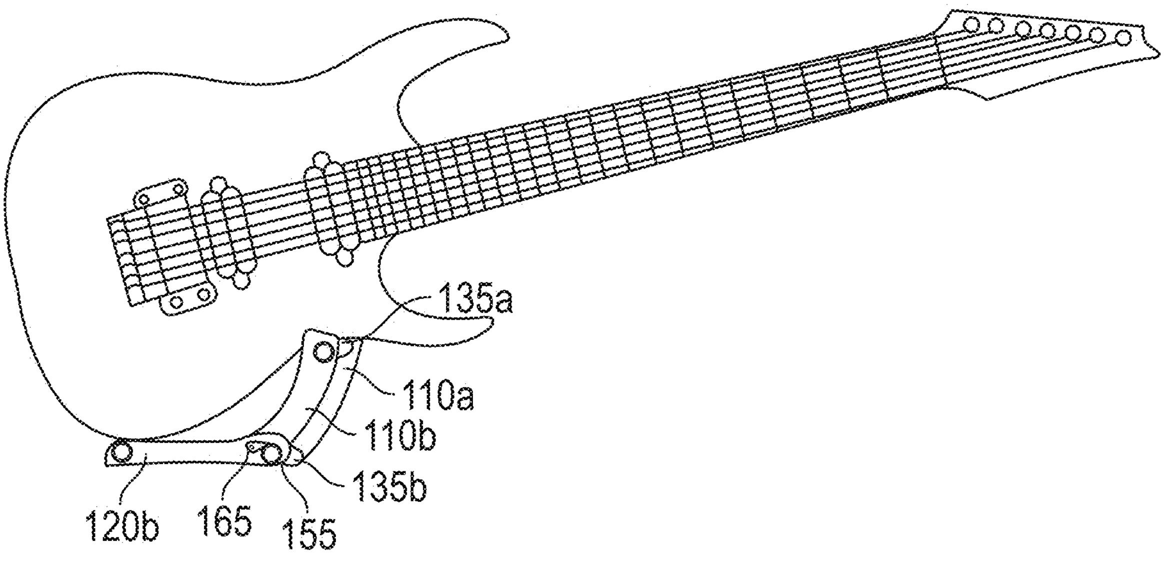
FIG. 17 is a side view of the thigh support apparatus of FIG. 1, expanded and supporting a guitar at an angle of separation, according to aspects of the present disclosure.
Figure 18:
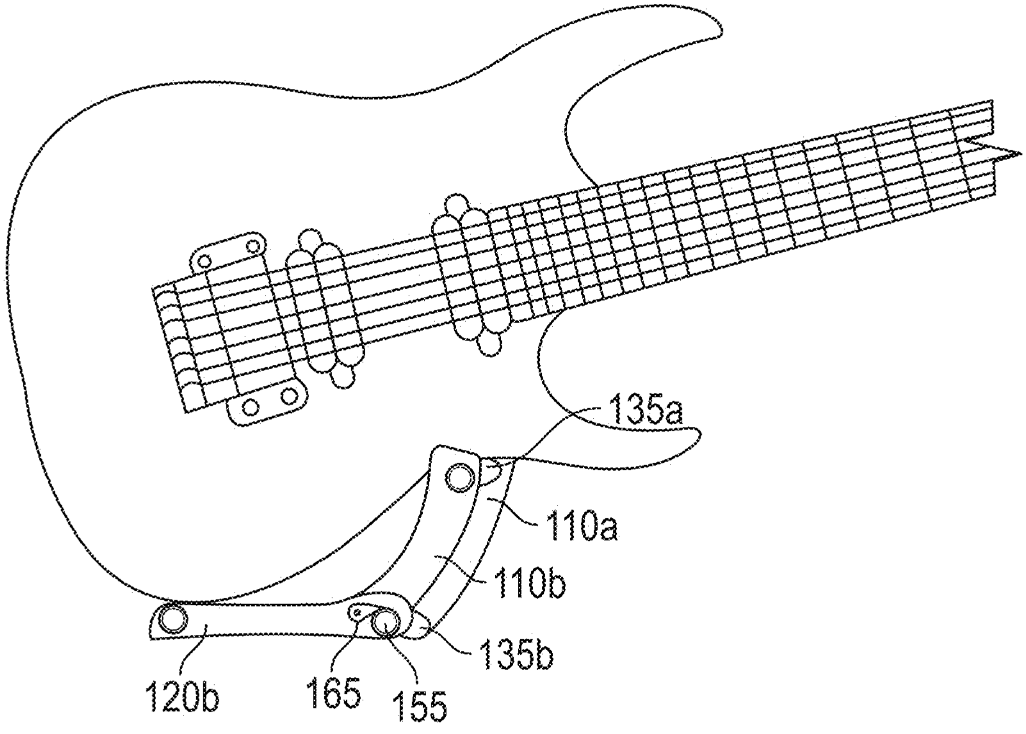
FIG. 18 is an enlarged partial view of the thigh support apparatus of FIG. 17, according to aspects of the present disclosure.

Referring to FIGS. 17 and 18, the thigh support apparatus is shown supporting a guitar with the brackets positioned at an angle of separation greater than a compact configuration. FIG. 17 illustrates a front view of the apparatus supporting the guitar, while FIG. 18 provides an enlarged partial view of the same configuration. In the configuration shown in FIGS. 17 and 18, the brackets are extended to an obtuse angle of approximately 110-120 degrees (and which may expand up 150 degrees). The obtuse angle of approximately 110-120 degrees may lengthen the distance between the crossbars, providing increased separation between the contact points where the guitar body rests on the apparatus. This increased separation may accommodate guitar bodies with larger dimensions or may provide a different balance point for the instrument during playing.

With continued reference to FIGS. 17 and 18, the angle between the brackets may be adjusted to suit different guitar shapes and user preferences. In some cases, the angle between the brackets may be compact at approximately 90 degrees. The compact angle of approximately 90 degrees may position the crossbars closer together, which may be suitable for smaller guitar bodies or for users who prefer a more concentrated support configuration. In other cases, the angle between the brackets may be obtuse at approximately 150 degrees, as shown in FIGS. 17 and 18. The obtuse angle may lengthen the distance between the crossbars, distributing the support points over a greater span of the guitar body. The user may select the angle of separation by depressing the lever to disengage the pawl from the ratchet gear, rotating the brackets to the desired angle, and releasing the lever to lock the brackets at the selected angular position.

Figure 19:
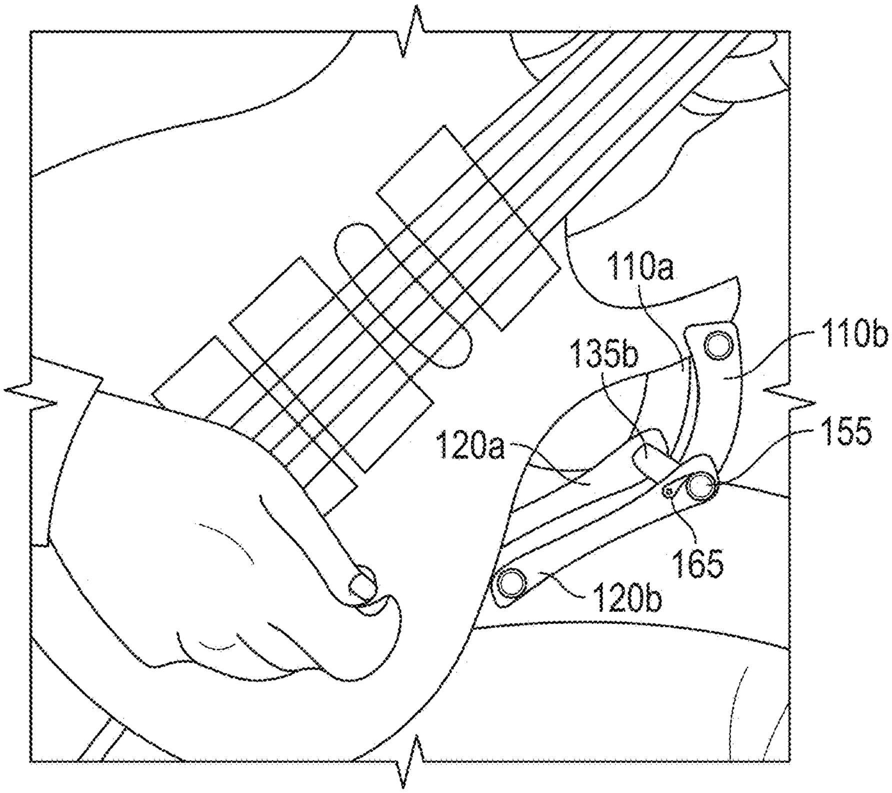
FIG. 19 illustrates a side view of the thigh support apparatus of FIG. 1 supporting a guitar on a user's thigh, according to aspects of the present disclosure.
Figure 20:
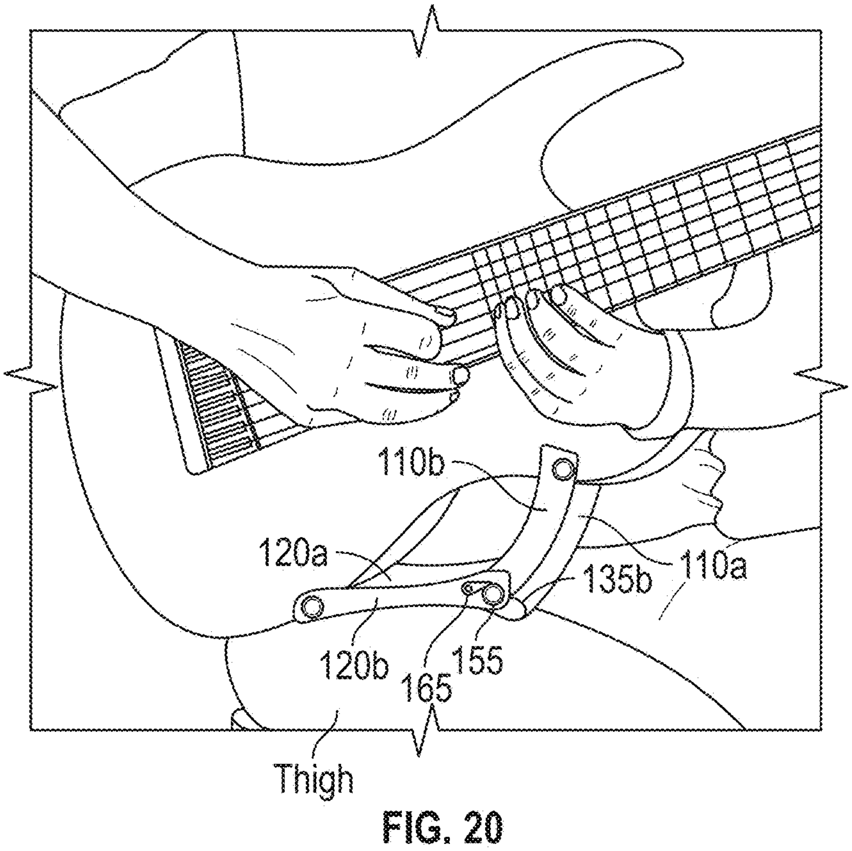
FIG. 20 illustrates a side view of the thigh support apparatus of FIG. 1 supporting a guitar in an alternate position, according to aspects of the present disclosure.

Referring to FIGS. 19 and 20, the thigh support apparatus is shown in use supporting a guitar on top of a user's thigh with the brackets positioned at different locations on the guitar. FIG. 19 illustrates a perspective front view of the apparatus supporting the guitar, while FIG. 20 illustrates a front view of the apparatus with the brackets positioned in different locations on the guitar when compared to FIG. 19. The apparatus may be oriented in different directions relative to the user depending on the user's comfort preference.

As further shown in FIGS. 19 and 20, the apparatus may be oriented to point inward toward the user or outward away from the user depending on the user's comfort preference. When the apparatus is oriented to point inward toward the user, the curvature of the brackets may accommodate the apparatus being positioned with the upper section angled toward the user's body. When the apparatus is oriented to point outward away from the user, the brackets may be positioned with the upper section angled away from the user's body. The user may manually select the orientation of the apparatus that provides the most comfortable playing position. The ability to orient the apparatus inward or outward may allow the user to adjust the position of the guitar relative to the user's body, which may affect the reach to the fretboard and the angle at which the user's hands contact the strings during playing.

Figure 21:
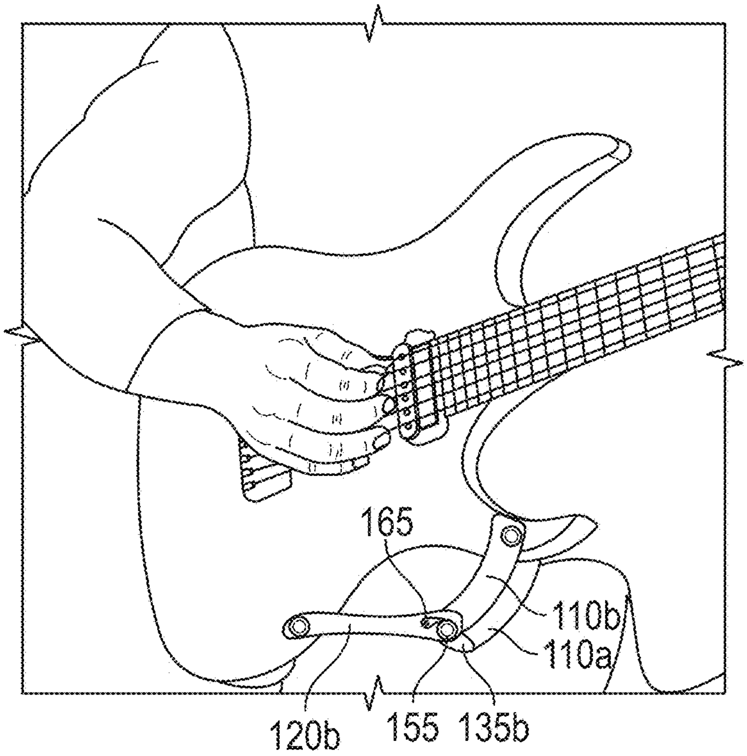
FIG. 21 illustrates a perspective, front view of the thigh support apparatus of FIG. 1 supporting a guitar in an alternate position, according to aspects of the present disclosure.
Figure 22:
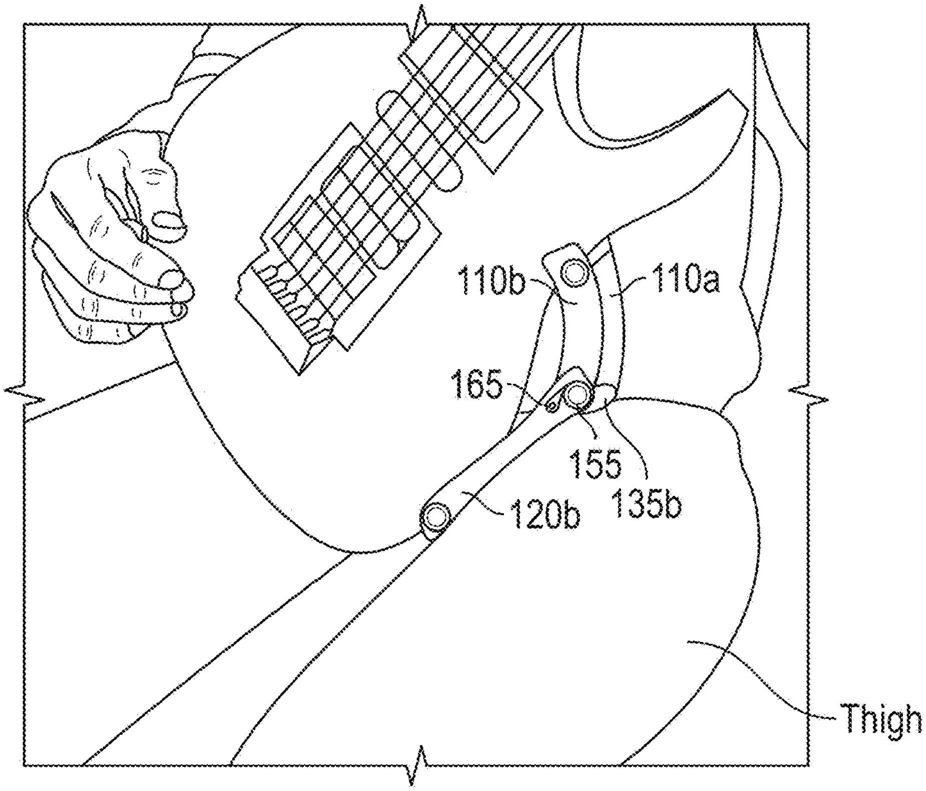
FIG. 22 illustrates a perspective, side view of the thigh support apparatus of FIG. 1 supporting a guitar in an alternate position, according to aspects of the present disclosure.

Referring to FIGS. 21 and 22, the thigh support apparatus is shown supporting a guitar in alternate playing positions. FIG. 21 illustrates the apparatus supporting a guitar with the instrument held in a playing position, while FIG. 22 illustrates the apparatus supporting a guitar in yet another alternate position. The alternate playing positions shown in FIGS. 21 and 22 demonstrate the adaptability of the apparatus to support guitars at various orientations relative to the ground and the user's body.

With continued reference to FIGS. 21 and 22, depending on the curvature of the guitar bottom edge, the locations for the crossbars may provide different heights from the underlying support surface or orientations of the instrument. The guitar shown in FIG. 21 is positioned more parallel to the ground when compared to the guitar orientation shown in FIG. 22. In FIG. 21, the crossbars contact portions of the guitar bottom edge that result in the guitar body being held at a relatively horizontal orientation, with the neck of the guitar extending at a shallow angle relative to the ground. This more horizontal orientation may be suitable for users who prefer to view the fretboard from above or who prefer a playing position where the guitar body is closer to level with the user's lap.

As further shown in FIG. 22, the guitar is oriented with the neck pointing more perpendicular to or away from the ground when compared to the orientation shown in FIG. 21. In FIG. 22, the crossbars contact different portions of the guitar bottom edge, resulting in the guitar body being held at an elevated angle where the neck extends upward at a steeper angle relative to the ground. This elevated orientation may be suitable for users who prefer to position the guitar neck at a higher angle during playing, which may affect the reach to higher frets or the angle at which the user's fretting hand contacts the fretboard.

The different heights and orientations achievable with the apparatus may result from the interaction between the crossbar locations and the curvature present on the bottom edge of the guitar body. Guitar bodies may have varying curvatures along the bottom edge, including concave sections, convex sections, and transitions between different curvature profiles. When the crossbars are positioned at different locations along the guitar bottom edge, the crossbars may contact portions of the bottom edge having different curvature characteristics. The curvature characteristics at the contact points may determine the angle at which the guitar body is supported relative to the underlying support surface, which in the configurations shown in FIGS. 21 and 22 is the user's thigh. The user may adjust the placement of the crossbars along the guitar bottom edge to achieve a desired height or orientation of the instrument during playing.

As will be appreciated, the thigh support apparatus may function through the coordinated interaction of collapsible bracket sections, telescoping crossbar systems, and a ratchet-controlled adjustment module to provide a customizable platform for supporting stringed instruments during seated playing. The collapsible bracket sections may enable the apparatus to transition between a compact storage configuration and an operative playing configuration. When the apparatus is in the collapsed state, the narrower upper bracket section may nest within the wider lower bracket section, reducing the overall footprint of the apparatus for storage or transport. When the apparatus is transitioned to the expanded state, the upper bracket section may rotate away from the lower bracket section about the pivot location, creating separation between the bracket sections that forms a support structure for a stringed instrument. The collapsible configuration may allow the apparatus to be stored in instrument cases, gig bags, or other carrying containers alongside the stringed instrument.

The telescoping crossbar systems may enable lateral width adjustment of the apparatus to accommodate stringed instruments of varying body widths. Each crossbar system may include crossbar members that slide relative to each other within a crossbar sleeve. When the crossbar members are positioned closer together within the crossbar sleeve, the lateral distance between the brackets on opposite sides of the apparatus may be reduced, which may accommodate narrower-bodied instruments such as electric guitars. When the crossbar members are telescoped apart within the crossbar sleeve, the lateral distance between the brackets may be increased, which may accommodate wider-bodied instruments such as acoustic guitars. The telescoping action may occur simultaneously at the crossbar systems located at the distal ends of the upper brackets, the distal ends of the lower brackets, and the pivot location, maintaining parallel alignment of the brackets during width adjustment.

The ratchet-controlled adjustment module may enable graduated angular adjustment between the upper bracket section and the lower bracket section. The adjustment module may include a pawl that engages with teeth on a ratchet gear to lock the bracket sections at a selected angle of separation. A spring may bias the pawl into engagement with the ratchet gear, maintaining the bracket sections at the locked angular position during use. When the user depresses a lever connected to the pawl, the pawl may disengage from the ratchet gear teeth, freeing the bracket sections to rotate relative to each other about the pivot location. The user may then rotate the bracket sections to a desired angle of separation and release the lever, allowing the spring to bias the pawl back into engagement with the ratchet gear and lock the bracket sections at the new angular position.

To adjust the apparatus for use with a particular stringed instrument, a user may perform a combination of angular adjustment and width adjustment. The user may depress the lever to release the pawl from the ratchet gear, rotate the upper bracket section relative to the lower bracket section to achieve a desired angle of separation, and release the lever to lock the bracket sections at the selected angle. The user may also telescope the crossbar members within the crossbar sleeves to adjust the lateral width of the apparatus, pulling the crossbar members apart to increase width or pushing the crossbar members together to decrease width. The combination of angular adjustment and width adjustment may allow the apparatus to be configured to support stringed instruments having different body shapes, different body widths, and different curvature profiles along the bottom edge of the instrument body.

The interaction between the bracket sections and the crossbar sleeves may provide contact surfaces for supporting the stringed instrument. When the apparatus is positioned on a user's thigh with the lower bracket section resting on the thigh, the crossbar sleeves may extend laterally across the apparatus and provide surfaces upon which the stringed instrument body may rest. The crossbar sleeve at the distal ends of the upper brackets may contact one portion of the instrument body, while the crossbar sleeve at the distal ends of the lower brackets may contact another portion of the instrument body. The angular separation between the bracket sections may determine the distance between these contact points, which may affect the stability and orientation of the instrument during playing. The lateral width of the apparatus may determine the span over which the crossbar sleeves extend, which may affect how the weight of the instrument is distributed across the user's thigh.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The invention claimed is:

1. A thigh support apparatus, comprising:

a first section of brackets comprising a first upper bracket and a second upper bracket arranged parallel to each other;

a second section of brackets comprising a first lower bracket and a second lower bracket arranged parallel to each other, wherein the first section of brackets and the second section of brackets are connected at a pivot location, and wherein the first section of brackets is configured to collapse into the second section of brackets when the apparatus is in a folded state;

a first crossbar system coupling distal ends of the first upper bracket and the second upper bracket together, wherein the first crossbar system is configured to telescope to adjust a lateral distance between the first upper bracket and the second upper bracket;

a second crossbar system coupling distal ends of the first lower bracket and the second lower bracket together, wherein the second crossbar system is configured to telescope to adjust a lateral distance between the first lower bracket and the second lower bracket;

a third crossbar system positioned at the pivot location and coupling proximal ends of the first section of brackets to proximal ends of the second section of brackets, wherein the third crossbar system is configured to telescope; and an adjustment module coupled to the third crossbar system and configured to control rotation of the first section of brackets relative to the second section of brackets around the pivot location.

2. The thigh support apparatus of claim 1, wherein the first crossbar system comprises a first crossbar sleeve surrounding a first crossbar member and a second crossbar member, and wherein the first crossbar member and the second crossbar member are configured to telescope relative to each other to adjust a lateral distance between the first upper bracket and the second upper bracket.

3. The thigh support apparatus of claim 2, wherein the second crossbar system comprises a second crossbar sleeve surrounding a third crossbar member and a fourth crossbar member, and wherein the third crossbar member and the fourth crossbar member are configured to telescope relative to each other to adjust a lateral distance between the first lower bracket and the second lower bracket.

4. The thigh support apparatus of claim 3, wherein the third crossbar system comprises a third crossbar sleeve surrounding a first pivot crossbar member and a second pivot crossbar member, and wherein the first pivot crossbar member and the second pivot crossbar member are configured to telescope relative to each other.

5. The thigh support apparatus of claim 4, wherein:

the first crossbar member, the second crossbar member, the third crossbar member, the fourth crossbar member, the first pivot crossbar member, and the second pivot crossbar member each have a lip on an end turned outward; and the first crossbar sleeve, the second crossbar sleeve, and the third crossbar sleeve each have a lip on an end turned inward, wherein the lips of the crossbar members and the lips of the crossbar sleeves form detents configured to prevent the crossbar members from being pulled out of the crossbar sleeves when telescoped apart.

6. The thigh support apparatus of claim 4, wherein the first crossbar sleeve, the second crossbar sleeve, and the third crossbar sleeve are covered by a rubber sheath configured to provide comfort to a user and to maintain the apparatus in position during use.

7. The thigh support apparatus of claim 1, wherein the adjustment module comprises a ratchet gear and a spring-loaded pawl system, and wherein the spring-loaded pawl system is configured to engage with teeth of the ratchet gear to lock the first section of brackets and the second section of brackets at a desired angle of separation.

8. The thigh support apparatus of claim 7, further comprising a lever connected to the spring-loaded pawl system, wherein depressing the lever releases the spring-loaded pawl system from engagement with the ratchet gear to permit rotation of the first section of brackets relative to the second section of brackets.

9. The thigh support apparatus of claim 1, wherein the first section of brackets is configured to swing from a closed horizontal position to a maximum angle of approximately 150 degrees relative to the second section of brackets.

10. The thigh support apparatus of claim 1, wherein the first upper bracket and the second upper bracket are curved, and wherein the first lower bracket and the second lower bracket have a bottom edge with curvature configured to conform to a top-side of a user's thigh.

11. The thigh support apparatus of claim 1, wherein the first section of brackets has a width narrower than a width of the second section of brackets.

12. A thigh support apparatus for supporting a stringed instrument, comprising:

an upper bracket section comprising a pair of upper brackets arranged parallel to each other;

a lower bracket section comprising a pair of lower brackets arranged parallel to each other, wherein the upper bracket section is pivotally connected to the lower bracket section at a pivot location;

a plurality of crossbar systems, each crossbar system comprising a crossbar sleeve surrounding at least two crossbar members configured to telescope relative to each other to adjust a lateral distance between brackets; and a ratchet and pawl mechanism coupled to the pivot location and configured to lock the upper bracket section and the lower bracket section at a selected angle of separation.

13. The thigh support apparatus of claim 12, wherein the upper bracket section is configured to collapse into the lower bracket section when the apparatus is in a folded state.

14. The thigh support apparatus of claim 13, wherein the pair of upper brackets has a width narrower than a width of the pair of lower brackets such that the pair of upper brackets is surrounded by the pair of lower brackets when the apparatus is in the folded state.

15. The thigh support apparatus of claim 12, wherein the ratchet and pawl mechanism comprises:

a ratchet gear having teeth; and a spring-loaded pawl configured to engage with the teeth of the ratchet gear to lock the upper bracket section and the lower bracket section at the selected angle of separation.

16. The thigh support apparatus of claim 15, further comprising a lever connected to the spring-loaded pawl, wherein depressing the lever releases the spring-loaded pawl from engagement with the ratchet gear to permit rotation of the upper bracket section relative to the lower bracket section.

17. The thigh support apparatus of claim 12, wherein the crossbar sleeves are covered by a rubber sheath configured to provide comfort to a user and to provide friction to maintain the stringed instrument in position during use.

18. The thigh support apparatus of claim 12, wherein the plurality of crossbar systems comprises:

a first crossbar system coupling distal ends of the pair of upper brackets together;

a second crossbar system coupling distal ends of the pair of lower brackets together; and a third crossbar system positioned at the pivot location and coupling proximal ends of the upper bracket section to proximal ends of the lower bracket section.

19. The thigh support apparatus of claim 12, wherein the pair of upper brackets are curved, and wherein the pair of lower brackets have a bottom edge with curvature configured to conform to a top-side of a user's thigh.

20. The thigh support apparatus of claim 12, wherein the upper bracket section and the lower bracket section are configured to be positioned at an angle of separation ranging from approximately 90 degrees to approximately 150 degrees.

* * * * *